June 24, 1924.
F. G. WILCOTT
WATER MOTOR
Filed May 17, 1922
1,498,707
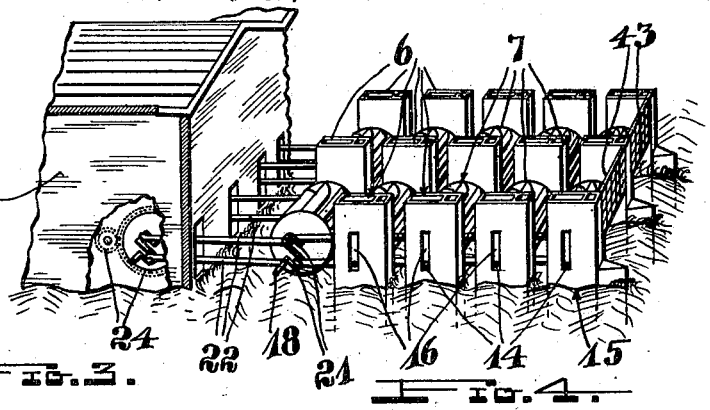
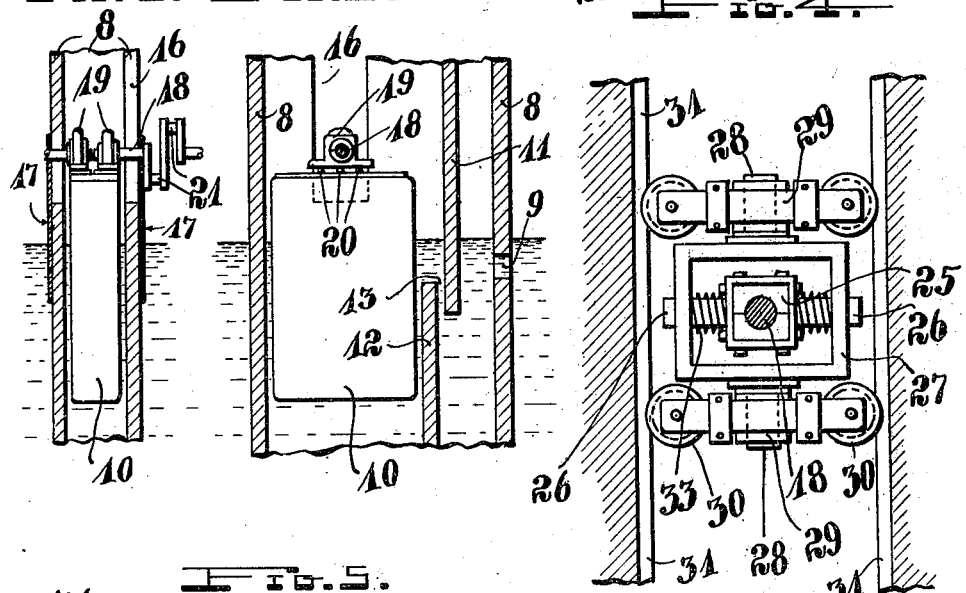
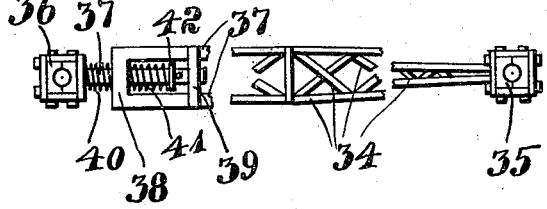
INVENTOR:
FREDERICK G. WILCOTT,
BY: *Otto H. Ruegez*,
his Atty.

Patented June 24, 1924.

1,498,707

UNITED STATES PATENT OFFICE.

FREDERICK G. WILCOTT, OF SAWTELLE, CALIFORNIA.

WATER MOTOR.

Application filed May 17, 1922. Serial No. 561,742.

*To all whom it may concern:*

Be it known that I, FREDERICK G. WILCOTT, a citizen of the United States, residing at Sawtelle, in the county of Los Angeles and State of California, have invented a new and useful Water Motor, of which the following is a specification.

This application is a continuation in part of my application for water motor, filed May 23, 1921, Serial No. 472,012, and now abandoned.

This invention relates to devices used for harnessing the waves or motions of the ocean, lakes, or other large bodies of water, for performing some mechanical operation.

One of the objects of this invention is to provide water wheels to be operated by the surface of the water or by the crest of a wave, and having means to normally hold the wheels in steady relation to the movements of the tides without being subjected to sudden and short changes of normal waves.

Another object is to provide a supporting float for controlling a water motor in proper relation to the power-producing current or movement in the water, not yielding materially to short and sudden movements of waves.

Another object is to provide supporting bearings for the water-actuated shafts with shock absorbing means.

Another object is to provide connecting means between the water-actuated shafts and the power transmitting with shock-absorbing means, so that short and sudden movements, caused by short and irregular waves, are not transmitted beyond the actuated shafts.

Another object is to provide float-holding compartments with tide-controlling means that are not influenced by short and irregular movements of waves.

Other objects will appear from the following description and appended claims as well as from the accompanying drawing, in which—

Fig. 1 is a perspective illustration of two normal units of water wheels, arranged according to the principle of this invention, only a portion of the power-transmitting station being indicated to illustrate that more units may be arranged in one power station.

Fig. 2 is a fragmentary vertical sectional view through a float chamber, illustrating the arrangement for supporting the water-actuated shafts.

Fig. 3 is a fragmentary vertical sectional view through a float chamber, at about right angles to the illustration in Fig. 2, illustrating the tide and wave control of the float-holding chamber.

Fig. 4 is a detail side elevation of a shock-absorbing journal construction.

Fig. 5 is a fragmentary side elevation of a connecting rod.

In Fig. 1, the device is illustrated as consisting of five water wheels in a unit. This is a desirable arrangement but it will easily be understood that more or less wheels can easily be arranged in one unit without requiring material changes as to the principle of the invention.

Each unit of water wheels is arranged between float-holding bodies, in order that the movement of the water can be guided to some extent in the desired direction to produce an actuating of the water wheels, two lines of bodies forming practically a passage for the water, the bodies being indicated at 6, and the water wheels being indicated at 7.

The float-holding bodies are preferably made of hollow concrete or reenforced columns. Two different views of the float-holding bodies are illustrated in Figs. 1 and 3. The outer walls 8 of the bodies are provided with proportionally small inlet openings 9, situated below low-water level, just large enough that the water will pass into the inside of the bodies as the level of the water changes between high-tide and ebb-tide or in the reversed manner. Such openings are, however, not large enough that water to a material extent can pass back and forth by the mere action of short or irregular waves, or any normal waves, so that the float 10 can in this manner be maintained at practically the level of the tide regardless of short, irregular or normal waves during any part of the tide. The opening 9 should however not be too small, since it might become closed by weeds or other material floating in the water, or even animals may close such a small opening. It is moreover desirable to screen such an opening, and, in such a case, the opening may be larger as long as the water, passing back and forth through the opening, is kept clean by the screening. Partitions 11 and 12 are in such a case preferably provided within the body. The partitions are, however, arranged very closely so as to leave little space between the partitions, as indicated at 13, for controlling the normal swellings of waves while allowing water to pass according to the change in the tide. The larger opening, under this arrangement, cannot influence the float 10, since the partitions are disposed in front of the opening 9, as illustrated in Fig. 3.

The water wheels are preferably more than forty feet in diameter, so that the centers of the water wheels, indicated at 14 in Fig. 1, are at least twenty feet above the level 15 of the water at low or ebb-tide. This allows a rise of twenty feet before the water can pass into the inside of the float-holding bodies through the journal-openings 16. Larger wheels can, of course, be provided, to allow more rise, but cover plates 17, indicated in Fig. 2, can easily be provided, inside as well as outside of the walls of the bodies, on the shafts, so that little water can pass through these openings 16, regardless of the size of the wheels and the distance allowed for rising of the wheels.

The wheel-shafts 18 are preferably mounted in ball and socket boxes or bearings 19, so that a wheel may be lifted on one end and lowered on the opposite end without causing extra friction within the journals. The bearings 19 are preferably not connected to the float in any way, but supported by rollers 20, so that the shaft may move back and forth slightly without being hindered by the float. The water wheels are normally heavy enough so that they will not lift off from the floats, and will not be lifted off by the movements of the water. The floats, on the other hand, always support the wheels, so that such a roller-support is quite practical.

On each end of each of the wheels 7 is a double crank 21, which, by means of the connecting rods 22, transmit the motions of the wheels to mechanism in the power station, a portion of a building being indicated at 23, and wheels being indicated at 24, in connection with the connecting rods 22.

Placing five water wheels in a unit, all connected by connecting rods, provides a uniform turning of all wheels in a unit, and, as soon as a turning commences, the five large wheels gain a momentum so that a well equalized turning movement can be maintained.

Shock-absorbing guiding journals are preferably disposed in the side openings 16 in the float-holding bodies 6. A journal of this type is illustrated in detail in Fig. 4. The wheelshaft 18 is turnably mounted in the center box 25. The box is pivotally supported by the pins 26. The pins 26 are turnably mounted in the frame 27. The frame 27 is provided with pins 28, which are turnably mounted in the cross members 29. The cross members are provided with double-flanged rollers 30, which are disposed to travel on the rails 31 and 32, embedded in the walls of the float-holding bodies. Shock-absorbing springs 33 are provided on the pins 26, so that the shaft 18 may move slightly back and forth within this journal structure without transmitting excessive shocks to the float-holding body, in which this journal is mounted.

The connecting rods, indicated at 22 in Fig. 1, are illustrated in detail in Fig. 5. All connecting rods are preferably made of similar design and construction, the rods between the several water wheels as well as the rods that connect the wheels with the power station. In Fig. 5, the main beam is made of lattice or net-work construction, to form a rigid and strong structure, though light, as indicated at 34. At one end of the beam a plain box-like bearing 35 is provided to form the rod end. The opposite end of the beam is preferably provided with a yielding, shock-absorbing means, to absorb any shocks resulting from sudden and irregular waves, as will be more fully described hereafter. The box-like rod-end 36 is for this reason provided with an extension end or stem 37. The main beam is provided with a yoke-like termination 37, having cross members 38 and 39. The stem 37 is slidingly mounted in the cross pieces or members 38 and 39. A spring 40 is inserted between the cross member 38 and the box-end 36, so as to control a moving of the rod-end 36 in the direction towards the main beam. Another spring 41 is inserted between the cross member 38 and a washer 42, secured on the stem 37, so as to control a moving of the stem 37 with the rod-end 36 in the direction away from the main beam.

As stated above, the water wheels are journaled and supported on the floats on rollers 20, allowing movements of the water-wheel-axles in a horizontal direction to some extent. This arrangement is mainly for obsorbing shocks, resulting from sudden and irregular waves. Large wheels are not able to yield to sudden changes to such an extent that they could revolve faster when subjected to sudden and irregular heavier strokes of waves. Such sudden and irregular movements are preferably absorbed by shock-absorbing means instead of being allowed to influence the rotating movement of the wheels. The shock-absorbing means in the connecting rods are intended to serve the same purpose, they even absorb variations in the rotating movements of the wheels.

With the arrangement of the slow overflowing facilities within the float-holding bodies, these water wheels can easily be made to rotate through a movement of water in a nearly horizontal direction as well as by movements of water in up and downward directions. The floats, supporting the water wheels, being maintained at the normal level of the tide, and not subject to the short, sudden and irregular movements of normal waves or normally moving water, the shorter movements of normal waves and the normal movement of water, apart from the movements of the tide, serve to actuate the wheels in a continuous manner. It is obvious that the water wheels can be maintained by the floats at such an elevation that the water wheels do not normally touch the water as long as the water is undisturbed, and so that only passing waves may touch the water wheels, thereby causing a rotating of the water wheels through the water, or the surface of the water, is not actually flowing or moving. If, for instance, a series of wheels of this type is arranged near the shore of the ocean, the normal steady stream or current of the surface, and the passing movements of the waves of the ocean water towards the shore, tend to actuate in a horizontal direction, while the regular as well as irregular short swells of waves tend to also actuate in an up and downward direction, since the supporting floats of the wheels are not influenced by such swells, on account of the slow overflow arrangement within the float-holding bodies or hollow columns 6.

A strong wall is provided in the oceanward end of the whole structure, as indicated at 43 in Fig. 1, for protecting the water wheels against storm and excessive waves. Under such abnormally unfavorable conditions, by action of the above described float-control, the water wheels are raised by such stormy and excessive high waves to a level behind the walls, so that the wheels cannot be damaged, and so that the wheels are not subjected to excessive strains for which they were not intended.

Having thus described my invention, I claim:

1. In a water motor, floats, hollow columns for the floats, each having a proportionally small aperture at a point to be at all times below the water level and adapted to admit water to the extent due to the slow and steady change of tides so as to maintain the floats disposed in the columns in suitable relation to the average level of the tide regardless of the shorter and irregular movements of the water outside of the columns, and water wheels disposed between the columns having means extending into the columns to operatively connect with the floats.

2. In a water motor, floats, hollow columns for the floats, each having a proportionally small aperture at a point to be at all times below the water surface and adapted to admit water to the extent due to the slow and steady change of tides so as to maintain the floats disposed in the columns in suitable relation to the average level of tide water regardless of the shorter and irregular movement of the water outside of the columns, water wheels disposed between the columns and above the tide level with their vanes extending to a point to be actuated by movements of the water above the tide level, and shafts for the water wheels extending into the columns to be supported by the floats.

3. In a water motor, a plurality of float-holding bodies having communication with the outside at a point to be at all times below the water surface so as to maintain a water level inside of the bodies in certain relation to the average level of the tide regardless of the shorter movements of the water and waves outside of the bodies, floats disposed in the bodies, water wheels disposed between the bodies, the bodies having slots at all times above the water level, guiding means at the opposite edges thereof, the axles of the water-wheels extending through the slots into the bodies to be supported by the floats, and journals on the axles having means to be movable between the guiding means in the slots of the bodies.

4. In a water motor, a plurality of float-holding bodies, floats disposed in the bodies, and water wheels disposed between the bodies with their axles extending into the bodies to be supported by the floats in the bodies, the bodies having small apertures at points to be at all times below the water surface and adapted to admit water to the extent due to the slow and steady change of tides regardless of the shorter and irregular movements of the water outside of the bodies, the operative relation of the floats in the bodies and the water wheels between the bodies being arranged so that the water actuated portions of the wheels are disposed in the level of the tide regardless of the surface or movements of the water around the wheels.

5. In a water motor, a plurality of float-holding bodies, floats disposed in the bodies, water wheels disposed between the bodies with their axles extending into the bodies to be supported by the floats in the bodies, journals movably disposed in the bodies to guide the axles and thereby the water-wheels, and shock-absorbing means in the journals.

6. In a water motor, a plurality of float-holding bodies, floats disposed in the bodies, water wheels disposed between the bodies with their axles extending into the bodies to be supported by the floats, journals movably disposed in the bodies to guide the axles and thereby the water wheels, shock-absorbing means in the journals, connecting rods for transmitting the motion from the water wheels, and shock-absorbing means in the connecting rods.

7. In a water motor, a plurality of float-holding bodies, floats disposed in the bodies, water wheels disposed between the bodies with their axles extending into the bodies to be supported by the floats, journals movably disposed in the bodies to guide the axles and thereby the water wheels, and a stationary storm wall at the ocean-ward termination of the device of which the lowermost edge is above the highest normal water level.

8. In a water motor, a hollow column closed on all lateral sides except for a small aperture at a point to be at all times below the water surface and of a size so as to maintain a water lever inside of a column in certain relation to the level of the tide regardless of the shorter and irregular movements of the water and waves outside of the column and except for slots extending upwardly from a point to be at all times above the water level in two opposite sides of the column.

9. In a water motor, a plurality of float-holding bodies each having communication with the outside at a point to be at all times below the water level so as to maintain a water level inside of the bodies in certain relation to the level of the tide regardless of the shorter movements of the water and waves outside of the bodies and each having slots above the normal water level, floats disposed in the bodies, water wheels disposed between the bodies with their axles extending through the said slots into the bodies to be supported by the floats, and cover-plates on the axles and disposed to close the slots while the water wheels are moving up and down.

In testimony that I claim the foregoing as my invention I have signed my name in the presence of two subscribing witnesses.

FREDERICK G. WILCOTT.

Witnesses:
O. H. KRUEGER,
JESSIE A. MANOCK.